United States Patent [19]
Ogle et al.

[11] Patent Number: 5,983,281
[45] Date of Patent: Nov. 9, 1999

[54] LOAD BALANCING IN A MULTIPLE NETWORK ENVIRONMENT

[75] Inventors: David Mark Ogle, Cary; Carolyn Haibt Norton, Apex; Karen Marie Tracey, Apex; Barton Clark Vashaw, Apex, all of N.C.

[73] Assignee: International Business Machines Corporation, Armonk, N.Y.

[21] Appl. No.: 08/847,416

[22] Filed: Apr. 24, 1997

[51] Int. Cl.$^6$ ................................................. H04L 12/46
[52] U.S. Cl. ......................... 709/249; 370/401; 709/239
[58] Field of Search ................................. 709/238, 239, 709/240, 241, 243, 244, 249; 395/200.56, 200.68, 200.69, 200.7, 200.71, 675; 370/220, 219, 400, 401

[56] References Cited

U.S. PATENT DOCUMENTS

| | | | |
|---|---|---|---|
| 5,315,592 | 5/1994 | Conant et al. | 370/401 |
| 5,327,424 | 7/1994 | Perlman | 370/401 |
| 5,365,523 | 11/1994 | Derby et al. | 370/85.2 |
| 5,398,012 | 3/1995 | Derby et al. | 340/825.03 |
| 5,473,599 | 12/1995 | Li et al. | 370/219 |
| 5,649,091 | 7/1997 | Ould-Ali et al. | 709/239 |
| 5,737,526 | 4/1998 | Periasamy et al. | 709/226 |
| 5,774,660 | 6/1998 | Brendel et al. | 709/226 |
| 5,835,696 | 11/1998 | Hess | 370/220 |
| 5,845,091 | 12/1998 | Dunne et al. | 370/400 |

OTHER PUBLICATIONS

Brent Baccala, ed., Connected: An Internet Encyclopedia Third Ed., "Bridging", 4 pp. Apr. 1997, www.FreeSoft.org/CIE/index.htm.

J. Postel (ed.), RFC 792: Internet Control Message Protocol, Network Working Group, pp. 1–15, Sep. 1981.

S. Deering, RFC 1256: ICMP Router Discovery Messages, Network Working Group, pp. 1–14, Sep. 1991.

Derby, et al., *IBM Technical Disclosure Bulletin*, NetBIOS Local Area Network Access Agents, vol. 36, No. 12, pp. 417–422 (Dec. 1993).

*The Attachmate® Gateway and Named Gateway Option*, Attachmate® Technical Bulletin ™55a (Nov. 1990), pp. 1–3.

*Primary Examiner*—Zarni Maung
*Assistant Examiner*—Patrice L. Winder
*Attorney, Agent, or Firm*—Myers Bigel Sibley & Sajovec; Jeanine S. Ray-Yarletts

[57] ABSTRACT

Methods, systems and computer program products are provided which dynamically balance the load between gateways which provide access between a first computer network and a second computer network. This load balancing includes receiving at a gateway a communication to be transmitted to a second computer network from a source device on the first computer network. The gateway determines, preferably based on an address contained in the communication, through which of the gateways the communication is to be transmitted and then either transmits the communication to the second network or over the first network to the determined gateway. A redirect message may then be sent to the source device to direct subsequent messages to the proper gateway. The gateway determination may be made by dividing a resource identifier into subgroups, summing the subgroups and then dividing the sum by the number of parallel gateways. The remainder may then be used as a gateway identifier.

52 Claims, 3 Drawing Sheets

LOAD BALANCING IN A MULTIPLE NETWORK ENVIRONMENT

FIELD OF THE INVENTION

The present invention relates to computer networks and more particularly to the routing of messages or communications between interconnected networks.

BACKGROUND OF THE INVENTION

In recent years, there has been a proliferation of interconnection of computers into computer networks. Computer networks allow computers to communicate with each other to allow resource sharing, provide communication between users and to allow other forms of collaboration between software, hardware and users across multiple computers.

One method of characterizing computer networks is geographically. Thus, networked computers which reside in a single building or campus are often referred to as a local area network or LAN. Computers which are networked to cross a wider geographic range such as across a city, state or country are often referred to as a wide area network or WAN. Furthermore, networks of computers may be interconnected to provide further communication between computers. Thus, for example, it is not uncommon for a network to be connected to another network by one or more devices. These devices are commonly called gateways and may be a computer, router, bridge or other electronic device which may be used to route message traffic between networks. Gateways may connect a LAN to a LAN, a LAN to a WAN or any combination of network to network. Gateways may also compensate for differences in protocols between the two networks. Thus, for example, a group of Transmission Control Protocol/Internet Protocol (TCP/IP) LANs may be interconnected by a Systems Network Architecture (SNA) WAN via a gateway.

As the size of local area networks has increased the amount of traffic carried by a gateway has also increased. To compensate for this increase in inter-network traffic, many networks have increased the number of gateways providing access to networks external to the LAN. Thus, it is not uncommon for two networks to be connected by multiple gateways. One problem which arises when multiple gateways are provided to a LAN is how to balance the traffic load between the gateways. This problem of load balancing may be explained with an example.

In a possible interconnection of computer networks, multiple computer networks are interconnected through gateway devices. These gateway devices may interconnect the multiple computer networks through a wide area network (WAN). When a workstation on a first local area network (LAN) sends a message to a device outside of the first LAN, one of the gateway devices connected to the first LAN forwards the message to the WAN and on to the network of the destination device. The gateways connecting the first LAN to the WAN may be referred to as parallel gateways as they each interconnect the same networks.

If there are many workstations on a single LAN requiring access to the WAN and most or all of the workstations utilize only one of multiple parallel gateways available the remaining gateways are underutilized and the utilized gateway may become a bottle-neck to communications outside the LAN. This may defeat the purpose of having parallel gateways as limited performance advantage may be obtained unless the traffic is more equally divided between the gateways.

One solution to the load balancing problem is to have a system administrator establish a sysdef for all the routes for each device connected to the first LAN, the WAN and the other LANs connected to the WAN. This sysdef, combined with native route exchange algorithms on the LANs would then keep all of the gateways or computers at a particular site up-to-date. However, this approach may require a large number of sysdefs which is human intensive and prone to error.

In view of the above discussion, there exists a need for improvement in the allocation of gateway resources in interconnecting networks. In particular, improvement is needed in the area of load balancing between gateways interconnecting two computer networks.

SUMMARY OF THE INVENTION

In view of the above discussion, it is an object of the present invention to provide improved communications between interconnected networks.

A further object of the present invention is to balance the load between multiple gateways interconnecting multiple networks.

Still another object of the present invention is to provide load balancing which dynamically reconfigures workstations so as to reduce or avoid the need for operator intervention at each workstation.

Yet another object of the present invention is to provide for the allocation of network resources to gateways so as to equally distribute resources across multiple gateways.

These and other objects of the present invention are provided by methods, systems and computer program products which dynamically balance the load between a plurality of gateways which provide access between a first computer network and a second computer network. This load balancing includes receiving at a first of the plurality of gateways a communication to be transmitted to the second computer network from a source device on the first computer network. The gateway then determines, preferably based on an address contained in the communication, through which of the plurality of gateways the communication is to be transmitted to the second computer network. The communication is then transmitted to the second computer network if it is determined that the first gateway is to transmit the communication to the second computer network. If another of the gateways is to transmit the communication to the second computer network then the communication is transmitted over the first computer network to the one of the plurality of gateways which is to transmit the communication to the second computer network. If the message is to be transmitted by another of the gateways, the first gateway may transmit a redirect communication to the source device identifying the gateway through which the message is transmitted so that subsequent communication will be directly transmitted to that gateway.

By receiving messages and then rerouting the messages to a specific gateway for transmission to the second computer network the present invention provides for load balancing between parallel gateways. Furthermore, by redirecting the source to the proper gateway such that subsequent communications are sent to the proper gateway in the first instance then the system becomes more balanced in the distribution of traffic across the gateways as the system operates. Because the source devices may be redirected to utilize a specific gateway for future communications, the system may dynamically balance the load through this redirection process. This dynamic reallocation of load provides for load balancing without the need for system administrator intervention.

In particular embodiments of the present invention, the first computer network is a local area network. Alternatively, the first computer network is a wide area network. Furthermore, the redirect communication may be an Internet Control Message Protocol (ICMP) redirect message to the source device.

In yet another embodiment of the present invention, the gateway through which a communication is transmitted is determined by splitting a resource identifier of the communication having a plurality of bits into sub-groups of bits based upon the number of gateways interconnecting the first computer network and the second computer network. After splitting the resource identifier into sub-groups, the sub-groups of bits are then summed to provide an allocation sum. The allocation sum is divided by the number of gateways interconnecting the first computer network and the second computer network and messages are allocated to the plurality of gateways based upon the remainder of this division. In particular embodiments of the present invention, the resource identifier is a source address of communications received from the first computer network and a destination address for communications received from the second computer network.

In another embodiment of the present invention a unique allocation identifier is assigned to each of the plurality of gateways. In such a case, messages are allocated to the plurality of gateways based upon the allocation identifier of a gateway and the remainder of the division. The allocation identifier may be a numeric identifier of between 0 and n−1 where n is the number of gateways interconnecting the first computer network and the second computer network. Messages may then be allocated to the gateway having an allocation identifier equal to the remainder of the division.

In still another embodiment of the present invention, the resource identifier is split into sub-groups where each sub-group includes k bits where k is the lowest power to which 2 may be raised to result in a value equal to or greater than the number of gateways interconnecting the first computer network and the second computer network. The resource identifier may also be split into sub-groups where at least one sub-group includes k bits where k is the lowest power to which 2 may be raised to result in a value equal to or greater than the number of gateways interconnecting the first computer network and the second computer network. The resource identifier is preferably divided such that all of the sub-groups have the same number of bits. However, in the event that all of the sub-groups do not have the same number of bits, it is preferred that no more than two sub-groups have fewer than k bits.

In another embodiment of the present invention, methods, systems and computer program products are provided which allocate resources among a plurality of gateways interconnecting a first computer network and a second computer network. Resource allocation is provided by splitting a resource identifier having a plurality of bits into sub-groups of bits based upon the number gateways across which the resources are to be allocated. The sub-groups of bits are summed to provide an allocation sum and the allocation sum divided by the number of gateways interconnecting the first computer network and the second computer network. Resources are then allocated to the plurality of gateways based upon the remainder of the division. The summing operations of the present invention may further be carried out after a mask has been applied to the resource identifier.

In another embodiment of the present invention, a unique allocation identifier is assigned to each of the plurality of gateways. Resources are then assigned to a gateway based upon the allocation identifier of a gateway and the remainder of the division. The allocation identifier may be a numeric identifier of between 0 and n−1 where n is the number of gateways interconnecting the first computer network and the second computer network. In such a case the allocation of resources to the gateway may be carried out by allocating resources to a gateway having an allocation identifier equal to the remainder of the division.

In a particular embodiment of the present invention, the resource identifier is split into sub-groups wherein each sub-group includes k bits where k is the lowest power to which 2 may be raised to result in a value equal to or greater than the number of gateways interconnecting the first computer network and the second computer network. Furthermore, the resource identifier may also be split into sub-groups wherein at least one sub-group includes k bits where k is the lowest power to which 2 may be raised to result in a value equal to or greater than the number of gateways interconnecting the first computer network and the second computer network.

By subdividing a resource identifier into subgroups of bits based upon the number of gateways, summing the sub-groups and the dividing the sum by the number of gateways an essentially uniform allocation of resources to gateways may be obtained. This allocation may be independent of the number of gateways because the number of gateways is accounted for in the allocation. Therefore, for a sufficiently large population of resources, the present invention may provide for relatively equal distribution of resources across multiple gateways.

As will be appreciated by those of skill in the art, the present invention may be embodied as a method, apparatus or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
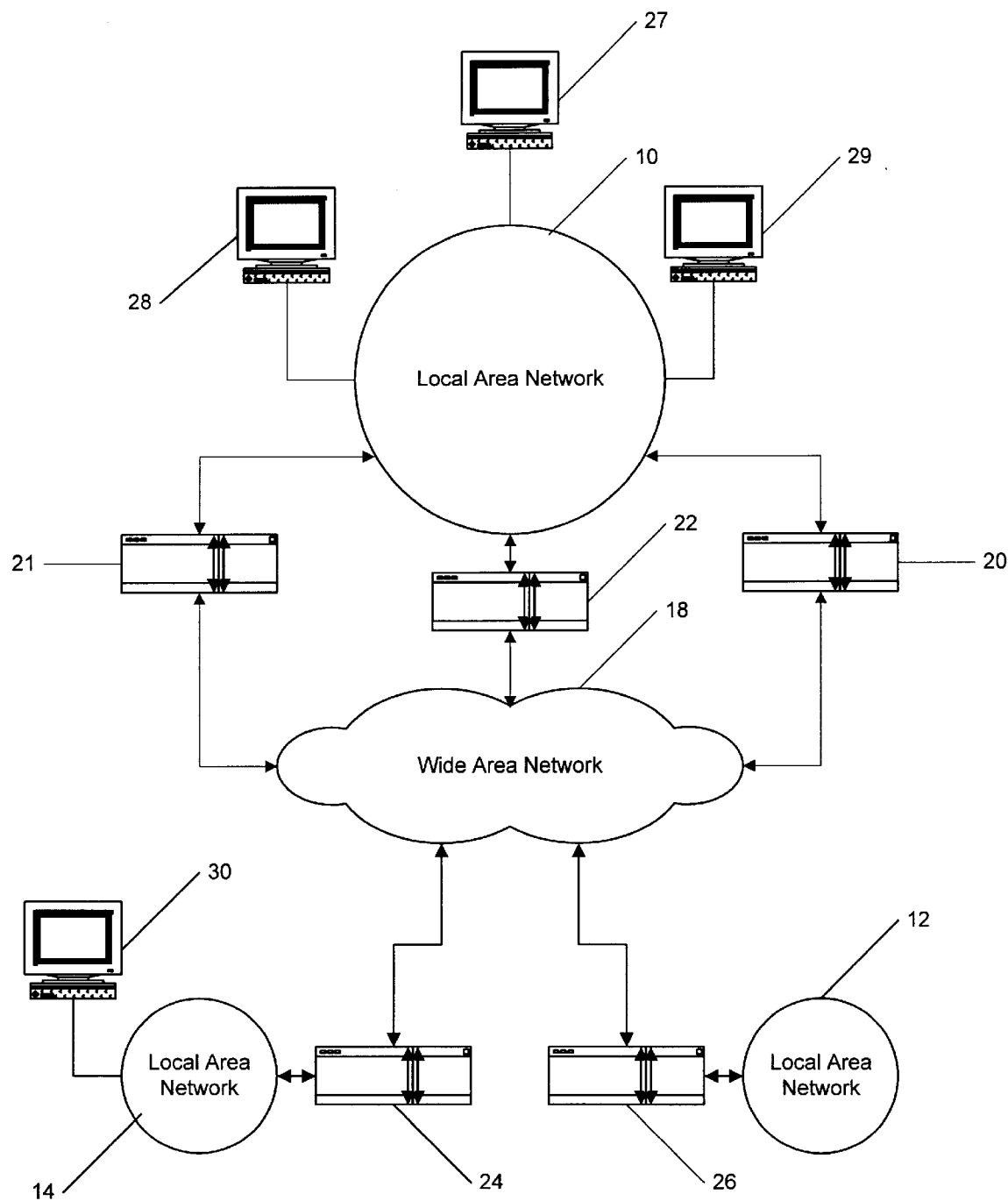
FIG. 1 is a block diagram of multiple interconnected networks.

FIG. 1 illustrates a network configuration which may utilize the present invention. As will be appreciated by those of skill in the art, the present invention is not intended to be limited to network configurations such as is illustrated in FIG. 1 but may be utilized in any number of other network configurations.

FIG. 1 illustrates a number of local area networks (10, 12, and 14) which are interconnected by wide area network 18. While three local area networks are illustrated in FIG. 1, the present invention may be utilized with any number of interconnected networks. Similarly, while network 18 is illustrated as a single network, it may be a network of networks.

As is seen in FIG. 1, LAN 10 is interconnected with WAN 18 through three gateway devices 20, 21 and 22. Also connected to LAN 10 are multiple workstations illustrated by workstations 27, 28 and 29. These workstations may communicate with WAN 18 through gateway devices 20, 21 and 22 and through WAN 18 with other networks, such as networks 12 and 14, or to devices directly connected to WAN 18.

Each of the workstations illustrated in FIG. 1 has associated with it a unique address which may be considered a network resource identifier. These addresses are typically binary numeric representations. For example, as used in the Internet Protocol (IP), a device has a 32 bit IP address which is often represented as four 8-bit bytes in the form xxx.xxx.xxx.xxx where xxx is a three digit numeric value between 0 and 255. Represented in binary form, an IP address would be bbbbbbbb.bbbbbbbb.bbbbbbbb.bbbbbbbb, where bbbbbbbb is an 8 bit binary value. Furthermore, as will be appreciated by those of skill in the art, LAN 10 may include any number of workstations which may be divided into "subnets" which are collections of devices based upon device addresses.

In communicating with WAN 18 a workstation on LAN 10 would direct a communication or message to one of the three gateways connected to LAN 10. This message would contain the address of the device which is the destination of the message (the destination address) and may contain the address of the device sending the message (the source address). The message may take any number of paths from the source device to the destination device which may involve communicating the message through multiple devices. Thus, for example, a message may be initiated by workstation 28 and transmitted through gateway 21 to WAN 18 to gateway 24 and to workstation 30 on network 14. Each of the steps in this path is referred to as a "hop." Thus, the communication of the message from gateway 21 to gateway 24 would be a hop in the present example. As will be discussed more fully herein, in carrying out certain aspects of the present invention it is preferable that the destination device in a hop of a message have available the address of the source device in the hop.

The present invention may be utilized in networks where devices which communicate to devices external to the network do so by transmitting messages to a specific gateway on the network for forwarding outside the network. Thus, for example, when workstation 28 initiates a communication with a destination device external to LAN 10, workstation 28 does so by sending the message to a specific one of the three gateways 20, 21 and 22 connected to LAN 10. Furthermore, according to the present invention, it is preferred that each device in LAN 10 will send all external communications having a common destination address to the same gateway for forwarding to WAN 18.

Initially each device connected to LAN 10 may transmit all messages to devices external to LAN 10 through a default gateway, such as gateway 20. For example, workstations 27, 28 and 29 would all send messages to gateway 20 for transmission on WAN 18. According to the present invention, however, when gateway 20 receives a message from a source device on the first computer network, LAN 10, which is to be transmitted to the second computer network, WAN 18, gateway 20 determines through which of the plurality of gateways, 20, 21 and 22 the communication is to be transmitted to the second computer network, WAN 18. The manner in which gateway 20 determines the gateway through which the message should be transmitted is described below. Gateway 20 then transmits the communication to the second computer network if gateway 20 determines that it is to transmit the communication to the second computer network. However, if gateway 20 determines that another gateway should transmit the message to the second computer network, WAN 18, then gateway 20 transmits the communication over LAN 10 to the gateway which gateway 20 determines should transmit the communication to WAN 18. Gateway 20 may then transmit a redirect communication to the source device identifying the gateway to which subsequent external communications should be directed if the message was not transmitted to WAN 18 by gateway 20. This redirect message may be an ICMP redirect message or other such messages as are known to those of skill in the art.

Similarly, if gateway 20 receives a message from WAN 18, gateway 20 would then determine through which gateway the message should be transmitted to LAN 10. Gateway 20 would then redirect the message over WAN 18 to the proper gateway or pass the message to LAN 10 if gateway 20 was the proper gateway. Gateway 20 may then send a redirect message to the source device of the WAN 18 hop of the message to redirect future communications to the proper gateway if gateway 20 was not the proper gateway. The determination of the proper gateway may be based upon an address contained in the message which may be the destination address of the message as will be discussed below.

By redirecting the source devices of messages to a gateway to transmit subsequent messages to other gateways, load balancing may be achieved. This load balancing is achieved by the allocation of network resources across the available parallel gateways through redirection. To achieve a balance of resource allocations across multiple gateways, however, the determination of gateway allocation by a gateway receiving a message should be made so as to evenly distribute resources between the gateways. Such an allocation technique is illustrated in FIG. 2 and FIG. 3.

The present invention will now be described with respect to FIG. 2 and FIG. 3 which are flowcharts illustrating the operation of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 2:
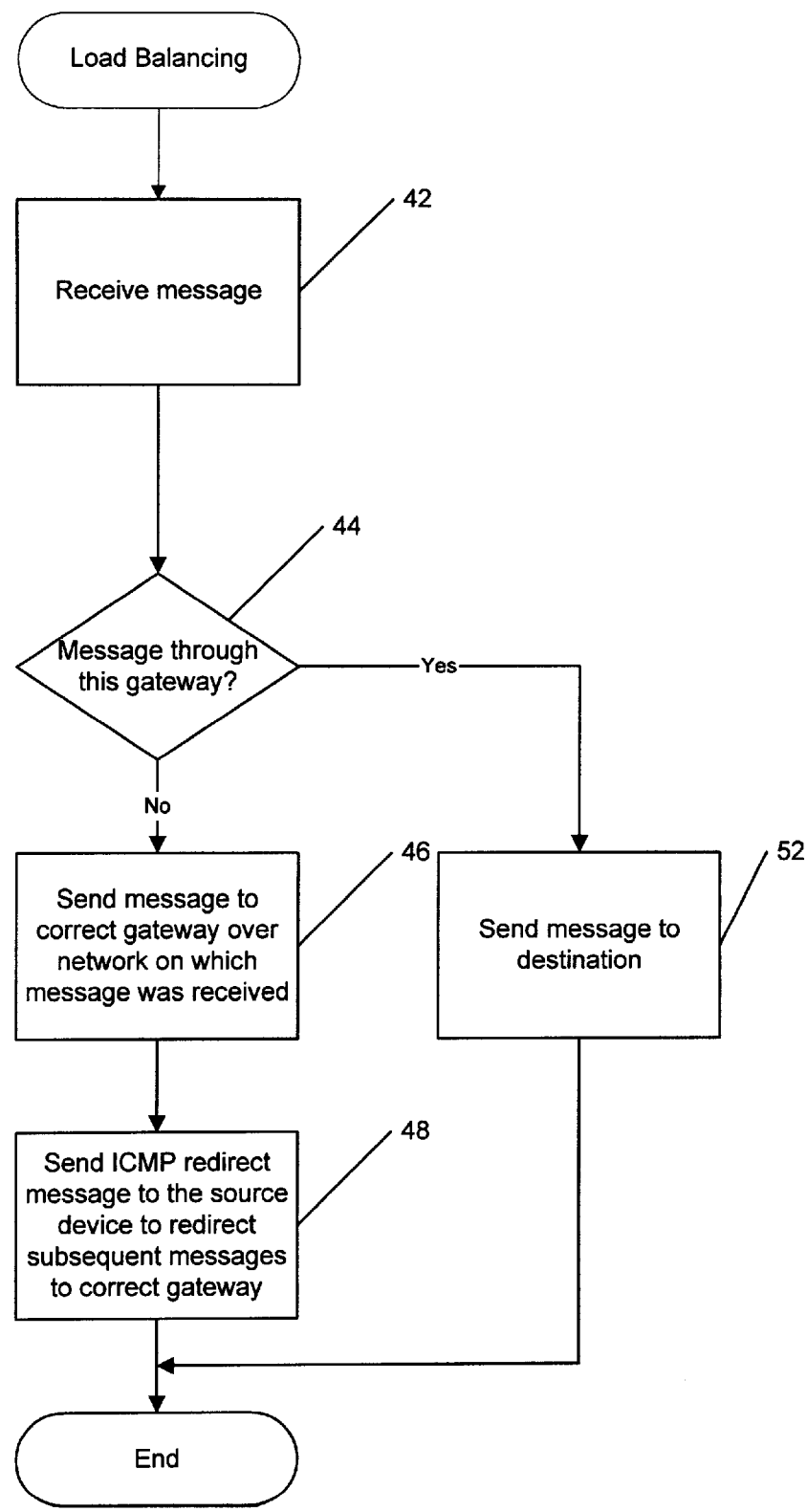
FIG. 2 is a flowchart of a load balancing function according to the present invention.
Figure 3:
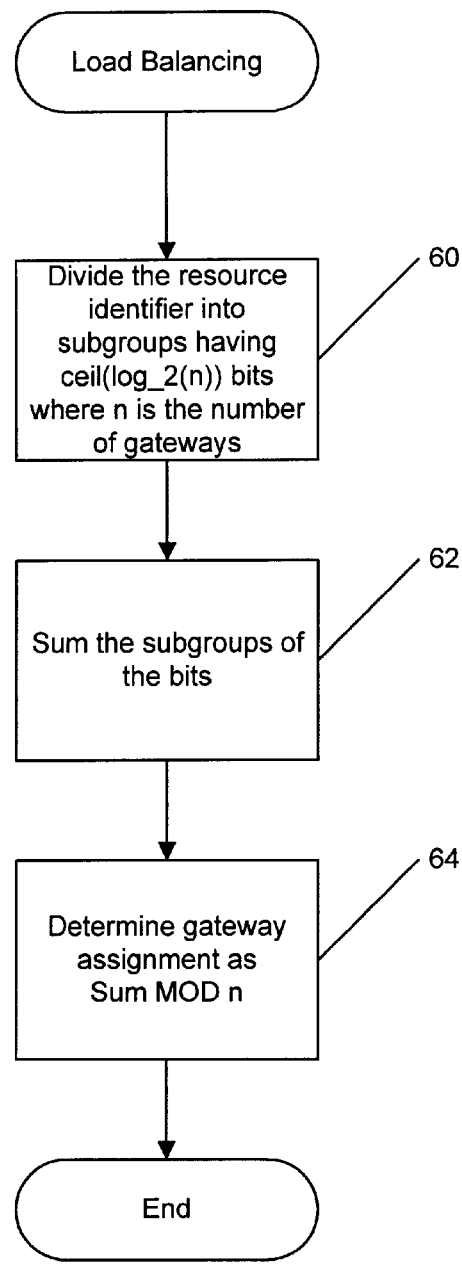
FIG. 3 is a flow chart of a further embodiment of load balancing according to the present invention.

FIG. 2 illustrates operations which may be performed by one of a plurality of gateways which interconnect two networks, such as gateways 20, 21 and 22 in FIG. 1. As seen in FIG. 2 when a gateway receives a message on a first computer network (block 42) it first determines whether the message should be routed through the gateway (block 44).

The gateway determination is preferably based upon an address contained in the message as is described below. The address may be either the source address, the destination address, last hop origin address or some other resource identifier. For example, in allocating resources to a gateway, the resource identifier may be a machine address, a network address, a port number of an application or any unique identifier associated with a source, a destination or an intermediate path in a message route. Thus, any unique identifier which repeatedly identifies a resource utilizing a parallel gateway for communicating between two networks and which may be represented in a binary fashion may be used.

The gateway may also use different resource identifiers based upon the network from which the communication is received. Thus, for example, the gateway 20 in FIG. 1 could utilize the destination address of a message received from LAN 10 as the resource identifier and the source address or origin of last hop address as the resource identifier for communications received from WAN 18. Alternatively, a gateway may use the same resource identifier in all messages. For example, a gateway may always utilize the source address in making the resource allocation determination. Accordingly, resources from one or both of the networks attached to multiple parallel gateways may be distributed across the gateways.

As is seen in block 52, if the gateway determines that the message was routed to the proper gateway, it then forwards the message to the destination on the second computer network and the message transmission ends for the gateway. If, however, the gateway determines that the message should have been routed to another gateway, then the gateway routes the message to the determined gateway on the first computer network (block 46) which is the network from which the message was received. The gateway then sends an ICMP redirect message to the origin of the last hop of the message to redirect subsequent messages to the proper gateway (block 48).

In the present example, the gateway receiving the message transmits the redirect, however, as will be appreciated by those of skill in the art, either the receiving gateway or the determined gateway may transmit the redirect message. Thus, the determined gateway, upon receipt of a message from another parallel gateway for retransmission on the network, could transmit to the source the redirect message. In the event that the origin of the last hop is the destination of the redirect message rather than the source, then the gateway receiving the message would need to provide the origin address to the determined gateway for transmission of the redirect message.

While the redirect aspects of the present invention have been described with respect to allocation based upon source address or last hop origin address, as will be appreciated by those of skill in the art, in some instance the origin of the last hop before reaching a gateway may not be known to the gateway. In such a case the gateway may still send a redirect message but, rather than conclusively establishing the origin of the last hop the gateway may inspect the message to determine the destination for the redirect message. In such a case the gateway would determine the address to which it would send a message if the message were directed to the source of the message received by the gateway. This address would then be used as the destination address of the redirect message. Thus, through the use of its own routing table a gateway may infer a likely candidate for the origin of the last hop and send a redirect message to this likely candidate.

FIG. 3 illustrates one manner of allocating resources among a number of gateways. The techniques of FIG. 3 may be used to balance the load between gateways on a network. Thus, the techniques illustrated in FIG. 3 may be utilized to make the determination made in block 44 of FIG. 2 so as to balance the load between gateways.

As is seen in FIG. 3, in determining the allocation of resources among gateways, such as the determination if a message has been directed to the proper gateway, the gateway first divides a resource identifier, which may be an address in a communication, into subgroups of bits. The number of bits in each subgroup is preferably the number of bits required to represent the number of gateways on the network. This relationship may be described as ceil (log_2(n)) where n is the number of gateways on the network and ceil is the ceiling function. In the example illustrated in FIG. 1, the number of bits would be 2 as there are 3 gateways and $2^2$ is 4. Thus, the preferred number of bits in each subgroup is k bits, where k is the lowest power to which 2 may be raised to result in a value equal to or greater than the number of gateways interconnecting the first computer network and the second computer network. Thus, the following table identifies the bits per subgroup as they are related to the number of gateways interconnecting two networks:

TABLE 1

Comparison of Gateways to Subgroup bits

| Gateways | Bits per Subgroup |
|---|---|
| 2 | 1 |
| 3 or 4 | 2 |
| 5 to 8 | 3 |
| 9 to 16 | 4 |

As a specific example, if an IP address which is used as the resource identifier is 10.1.1.0, then written in binary form is:

00001010.00000001.00000001.00000000.

Divided into subgroups of 2 bits per subgroup results in:

00 00 10 10 00 00 00 01 00 00 00 01 00 00 00.

If however, 6 gateways interconnect the two networks then k=3 as $2^3$ is the lowest power of 2 which results in a value large enough to include all of the gateways. Then, the division would result in:

00 001 010 000 000 010 000 000 100 000 000;

if the division into subgroups is started from the right. While the present example illustrates dividing the address beginning on the right side of the address, the division of the address may start on the right, the left or at any arbitrary point in the middle. As can be seen in this example, not all of the subgroups may have k bits. However, at most 2 subgroups will have less than k bits.

After dividing the resource identifier into subgroups, the gateway then sums the subgroups of bits (block 62) to provide an allocation sum which is an intermediate value for use in allocating resources to gateways according to the present invention. In the present example, the allocation for the 3 gateway system illustrated in FIG. 1 with the address 10.1.1.0 would be 2+2+1+1 which is 6. In the 6 gateway example, the same address would result in an allocation sum of 1+2+2+4 which is 9.

After determining the allocation sum, the gateway then integer divides the allocation sum by the number of gateways to determine the remainder of this integer division (block 64). The remainder of the integer division, or the allocation sum MOD n where n is the number of gateways, may be used to assign the resource to a gateway. Thus, in the present example, for the 3 gateway system the remainder would be 6 MOD 3 which is 0 and for the 6 gateway system the remainder would be 9 MOD 6 which is 3.

By assigning a unique allocation identifier to each of a plurality of gateways interconnecting two networks, the remainder may simply be used to determine the gateway to which resources are allocated and, hence, to which messages from the address may be routed. For example, if the allocation identifier of the gateways range from 0 to n−1 where n is the number of gateways, then the remainder may be directly utilized to allocate resources between the gateways. Continuing with the present example, for the 3 gateway system then the allocated gateway would be gateway 0 and for the 6 gateway system the allocated gateway would be gateway 3. Similarly, the gateway addresses may be located in a look-up table which is indexed by the remainder to determine the gateway to which resources are allocated and the messages from that resource are to be routed.

Returning to FIG. 2 and utilizing the resource allocation techniques of FIG. 3, after determining the allocation of a resource to a gateway, the gateway may determine if a received message was associated with a resource allocated to that gateway. Thus, in block 44 of FIG. 2 the technique of FIG. 3 may be used to determine message routing based on the gateway to which a resource is allocated. Therefore, knowing the remainder of the division from block 64 of FIG. 2 and the allocation identifier of each gateway, the gateway receiving the message may then determine if the gateway associated with the address allocates the message to that gateway. If not, as reflected in FIG. 2, the message is sent on to the proper gateway and subsequently redirected to that gateway.

The present invention has been described with respect to an address associated with a workstation. However, as will be appreciated by those of skill in the art, any number of network resources and any resource identifier may be used with the present invention. For example, net id, hostid, portid or tpname could all be used in carrying out the present invention. Furthermore, if the allocation of load of the gateways is to be based upon subnets or some other grouping of network resources the resource identifier used in the allocation determination may be masked prior to splitting the resource identifier into subgroups. Thus, for example, a mask may be applied to the source address of a message to send all messages originated by a subnet of LAN 10 to the same gateway. Whatever the address on which the allocation of gateways is based, the traffic associated with the particular address, such as subnets, should be approximately equal to provide more uniform distribution across the gateways.

As an example of how various address and gateway combinations could be allocated utilizing the present invention, a group of subnets and gateways may be examined. Assuming that there are 16 subnets in a LAN having addresses 10.1.0.0 through 10.1.16.0 then the following results may be obtained for an interconnection of 2 to 8 gateways:

TABLE 2

Example Subnet/Gateway Allocation

| Subnet Address | One bit subgroup | | Two bit subgroup | | | Three bit subgroup | | | | |
|---|---|---|---|---|---|---|---|---|---|---|
| | Sum | # of Gateways 2 | Sum | # of Gateways 3 | 4 | Sum | # of Gateways 5 | 6 | 7 | 8 |
| 10.1.0.0 | 3 | 1 | 5 | 2 | 1 | 5 | 0 | 5 | 5 | 5 |
| 10.1.1.0 | 4 | 0 | 6 | 0 | 2 | 9 | 4 | 3 | 2 | 1 |
| 10.1.2.0 | 4 | 0 | 7 | 1 | 3 | 6 | 1 | 0 | 6 | 6 |
| 10.1.3.0 | 5 | 1 | 8 | 2 | 0 | 10 | 0 | 4 | 3 | 2 |
| 10.1.4.0 | 4 | 0 | 6 | 0 | 2 | 7 | 2 | 1 | 0 | 7 |
| 10.1.5.0 | 5 | 1 | 7 | 1 | 3 | 11 | 1 | 5 | 4 | 3 |
| 10.1.6.0 | 5 | 1 | 8 | 2 | 0 | 8 | 3 | 2 | 1 | 0 |
| 10.1.7.0 | 6 | 0 | 9 | 0 | 1 | 12 | 2 | 0 | 5 | 4 |
| 10.1.8.0 | 4 | 0 | 7 | 1 | 3 | 9 | 4 | 3 | 2 | 1 |
| 10.1.9.0 | 5 | 1 | 8 | 2 | 0 | 13 | 3 | 1 | 6 | 5 |
| 10.1.10.0 | 5 | 1 | 9 | 0 | 1 | 10 | 0 | 4 | 3 | 2 |
| 10.1.11.0 | 6 | 0 | 10 | 1 | 2 | 14 | 4 | 2 | 0 | 6 |
| 10.1.12.0 | 5 | 1 | 8 | 2 | 0 | 11 | 1 | 5 | 4 | 3 |
| 10.1.13.0 | 6 | 0 | 9 | 0 | 1 | 15 | 0 | 3 | 1 | 7 |
| 10.1.14.0 | 6 | 0 | 10 | 1 | 2 | 12 | 2 | 0 | 5 | 4 |
| 10.1.15.0 | 7 | 1 | 11 | 2 | 3 | 16 | 1 | 4 | 2 | 0 |

As is seen in Table 2, the use of the present invention can result in an essentially even distribution of resources among the gateways. Thus, the present invention can provide for the equal distribution of network resources among the parallel gateways essentially independent of the number of gateways.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of dynamically balancing a load between a plurality of gateways which provide access between a first computer network and a second computer network, the method comprising:

receiving at a first of the plurality of gateways a communication from a source device on the first computer network, wherein the communication is to be transmitted to the second computer network;

determining through which of the plurality of gateways the communication is to be transmitted to the second computer network so as to balance the load between the plurality of gateways based upon a resource identifier associated with the source device received in the communication from the source device;

transmitting the communication to the second computer network if said determining step determines that the first gateway is to transmit the communication to the second computer network;

transmitting the communication from the first of the plurality of gateways over the first computer network to the one of the plurality of gateways which said determining step determines the communication is to be transmitted if said determining step determines that a gateway other than the first gateway is to transmit the communication to the second computer network.

2. The method according to claim 1 wherein the first computer network is a local area network.

3. The method according to claim 1 wherein the first computer network is a wide area network.

4. The method according to claim 1, further comprising the step of:

transmitting a redirect communication to the source device identifying the one of the plurality of gateways determined by said determining step if said determining step determines that a gateway other than the first gateway is to transmit the communication to the second computer network.

5. The method according to claim 1 wherein said transmitting a redirect communication step comprises the step of transmitting an Internet Control Message Protocol (ICMP) redirect message to the source device.

6. A method of dynamically balancing a load between a plurality of gateways which provide access between a first computer network and a second computer network, the method comprising:

receiving at a first of the plurality of gateways a communication from a source device on the first computer network, wherein the communication is to be transmitted to the second computer network;

determining through which of the plurality of gateways the communication is to be transmitted to the second computer network;

transmitting the communication to the second computer network if said determining step determines that the first gateway is to transmit the communication to the second computer network; and transmitting the communication over the first computer network to the one of the plurality of gateways which said determining step determines the communication is to be transmitted if said determining step determines that a gateway other than the first gateway is to transmit the communication to the second computer network; and wherein said determining step comprises the steps of:

splitting a resource identifier of the communication having a plurality of bits into sub-groups of bits based upon the number gateways interconnecting the first computer network and the second computer network;

summing the sub-groups of bits to provide an allocation sum;

dividing the allocation sum by the number of gateways interconnecting the first computer network and the second computer network; and allocating messages to the plurality of gateways based upon the remainder of said dividing step.

7. The method of claim 6, wherein the resource identifier is a source address of communications received from the first computer network and a destination address for communications received from the second computer network.

8. The method of claim 6, further comprising the step of assigning a unique allocation identifier to each of the plurality of gateways and wherein said step of allocating messages comprises the step of allocating messages to the plurality of gateways based upon the allocation identifier of a gateway and the remainder of said dividing step.

9. The method according to claim 8, wherein said assigning step comprises assigning as the allocation identifier a numeric identifier of between 0 and n=1 where n is the number of gateways interconnecting the first computer network and the second computer network; and wherein said allocating step comprises the step of allocating messages to the gateway having an allocation identifier equal to the remainder of said dividing step.

10. The method according to claim 6, wherein said splitting step comprises the step of splitting the resource identifier into sub-groups wherein each sub-group includes k bits where k is the lowest power to which 2 may be raised to result in a value equal to or greater than the number of gateways interconnecting the first computer network and the second computer network.

11. The method according to claim 6, wherein said splitting step comprises the step of splitting the resource identifier into sub-groups wherein at least one sub-group includes k bits where k is the lowest power to which 2 may be raised to result in a value equal to or greater than the number of gateways interconnecting the first computer network and the second computer network.

12. The method according to claim 6, further comprising the step of masking the resource identifier prior to said splitting step.

13. A method of allocating network resources among a plurality of gateways interconnecting a first computer network and a second computer network, the method comprising the steps of:

splitting a resource identifier having a plurality of bits into sub-groups of bits based upon the number gateways interconnecting the first computer network and the second computer network;

summing the sub-groups of bits to provide an allocation sum;

dividing the allocation sum by the number of gateways interconnecting the first computer network and the second computer network; and allocating resources to the plurality of gateways based upon the remainder of said dividing step.

14. The method of claim 13, further comprising the step of assigning a unique allocation identifier to each of the plurality of gateways and wherein said step of allocating resources comprises the step of allocating resources to the plurality of gateways based upon the allocation identifier of a gateway and the remainder of said dividing step.

15. The method according to claim 14, wherein said assigning step comprises assigning as the allocation identifier a numeric identifier of between 0 and n−1 where n is the number of gateways interconnecting the first computer network and the second computer network; and wherein said allocating step comprises the step of allocating resources to the gateway having an allocation identifier equal to the remainder of said dividing step.

16. The method according to claim 13, wherein said splitting step comprises the step of splitting the address into sub-groups wherein each sub-group includes k bits where k is the lowest power to which 2 may be raised to result in a value equal to or greater than the number of gateways interconnecting the first computer network and the second computer network.

17. The method according to claim 13, wherein said splitting step comprises the step of splitting the address into sub-groups wherein at least one sub-group includes k bits where k is the lowest power to which 2 may be raised to result in a value equal to or greater than the number of gateways interconnecting the first computer network and the second computer network.

18. The method according to claim 13, further comprising the step of masking the resource identifier prior to said splitting step.

19. A system for dynamically balancing a load between a plurality of gateways which provide access between a first computer network and a second computer network, the system comprising:

means for receiving at a first of the plurality of gateways a communication from a source device on the first computer network, wherein the communication is to be transmitted to the second computer network;

means for determining through which of the plurality of gateways the communication is to be transmitted to the second computer network so as to balance the load between the plurality of gateways based upon a resource identifier associated with the source device received in the communication from the source device;

means for transmitting the communication to the second computer network if said means for determining determines that the first gateway is to transmit the communication to the second computer network; and means for transmitting the communication from the first of the plurality of gateways over the first computer network to the one of the plurality of gateways which said means for determining determines the communication is to be transmitted if said means for determining determines that a gateway other than the first gateway is to transmit the communication to the second computer network.

20. The system according to claim 19 wherein the first computer network is a local area network.

21. The system according to claim 19 wherein the first computer network is a wide area network.

22. The system according to claim 19, further comprising:

means for transmitting a redirect communication to the source device identifying the one of the plurality of gateways determined by said means for determining if said means for determining determines that a gateway other than the first gateway is to transmit the communication to the second computer network.

23. The system according to claim 19 wherein said means for transmitting a redirect communication comprises means for transmitting an Internet Control Message Protocol (ICMP) redirect message to the source device.

24. A system for dynamically balancing a load between a plurality of gateways which provide access between a first computer network and a second computer network, the system comprising:

means for receiving at a first of the plurality of gateways a communication from a source device on the first computer network, wherein the communication is to be transmitted to the second computer network;

means for determining through which of the plurality of gateways the communication is to be transmitted to the second computer network;

means for transmitting the communication to the second computer network if said means for determining determines that the first gateway is to transmit the communication to the second computer network; and means for transmitting the communication over the first computer network to the one of the plurality of gateways which said means for determining determines the communication is to be transmitted if said means for determining determines that a gateway other than the first gateway is to transmit the communication to the second computer network; and wherein said means for determining comprises:

means for splitting a resource identifier of the communication having a plurality of bits into sub-groups of bits based upon the number gateways interconnecting the first computer network and the second computer network;

means for summing the sub-groups of bits to provide an allocation sum;

means for dividing the allocation sum by the number of gateways interconnecting the first computer network and the second computer network; and means for allocating messages to the plurality of gateways based upon the remainder of said means for dividing.

25. The system of claim 24, wherein the resource identifier is a source address of communications received from the first computer network and a destination address for communications received from the second computer network.

26. The system according to claim 24, further comprising means for assigning a unique allocation identifier to each of the plurality of gateways and wherein said means for allocating messages comprises means for allocating messages to the plurality of gateways based upon the allocation identifier of a gateway and the remainder of said means for dividing.

27. The system according to claim 26, wherein said means for assigning comprises means for assigning as the allocation identifier a numeric identifier of between 0 and n−1 where n is the number of gateways interconnecting the first computer network and the second computer network; and wherein said means for allocating comprises means for allocating messages to the gateway having an allocation identifier equal to the remainder of said means for dividing.

28. The system according to claim 24, wherein said means for splitting comprises means for splitting the resource identifier into sub-groups wherein each sub-group includes k bits where k is the lowest power to which 2 may be raised to result in a value equal to or greater than the number of gateways interconnecting the first computer network and the second computer network.

29. The system according to claim 24, wherein said means for splitting comprises means for splitting the resource identifier into sub-groups wherein at least one sub-group includes k bits where k is the lowest power to which 2 may be raised to result in a value equal to or greater than the number of gateways interconnecting the first computer network and the second computer network.

30. The system according to claim 24, further comprising means for masking the address prior to said splitting step.

31. A system for allocating network resources among a plurality of gateways interconnecting a first computer network and a second computer network, the system comprising:
   means for splitting a resource identifier having a plurality of bits into sub-groups of bits based upon the number gateways interconnecting the first computer network and the second computer network;
   means for summing the sub-groups of bits to provide an allocation sum;
   means for dividing the allocation sum by the number of gateways interconnecting the first computer network and the second computer network; and
   means for allocating resources to the plurality of gateways based upon a remainder of said means for dividing.

32. The system according to claim 31, further comprising means for assigning a unique allocation identifier to each of the plurality of gateways and wherein said means for allocating resources comprises means for allocating resources to the plurality of gateways based upon the allocation identifier of a gateway and the remainder of said means for dividing.

33. The system according to claim 32, wherein said means for assigning comprises means for assigning as the allocation identifier a numeric identifier of between 0 and n−1 where n is the number of gateways interconnecting the first computer network and the second computer network; and
   wherein said means for allocating comprises means for allocating resources to the gateway having an allocation identifier equal to the remainder of said means for dividing.

34. The system according to claim 31, wherein said means for splitting comprises means for splitting the address into sub-groups wherein each sub-group includes k bits where k is the lowest power to which 2 may be raised to result in a value equal to or greater than the number of gateways interconnecting the first computer network and the second computer network.

35. The system according to claim 31, wherein said means for splitting comprises means for splitting the address into sub-groups wherein at least one sub-group includes k bits where k is the lowest power to which 2 may be raised to result in a value equal to or greater than the number of gateways interconnecting the first computer network and the second computer network.

36. The system according to claim 31, further comprising means for masking the resource identifier prior to said splitting step.

37. A computer program product for dynamically balancing a load between a plurality of gateways which provide access between a first computer network and a second computer network, the computer program product comprising:
   a computer-readable storage medium having computer-readable program code means embodied in said medium, said computer-readable program code means comprising:
      computer-readable program code means for receiving at a first of the plurality of gateways a communication from a source device on the first computer network, wherein the communication is to be transmitted to the second computer network;
      computer-readable program code means for determining through which of the plurality of gateways the communication is to be transmitted to the second computer network so as to balance the load between the plurality of gateways based upon a resource identifier associated with the source device received in the communication from the source device;
      computer-readable program code means for transmitting the communication to the second computer network if said computer-readable program code means for determining determines that the first gateway is to transmit the communication to the second computer network; and
      computer-readable program code means for transmitting the communication from the first of the plurality of gateways over the first computer network to the one of the plurality of gateways which said computer-readable program code means for determining determines the communication is to be transmitted.

38. The computer program product according to claim 37, further comprising:
   computer-readable program code means for transmitting a redirect communication to the source device identifying the one of the plurality of gateways determined by said means for determining if said computer-readable program code means for determining determines that a gateway other than the first gateway is to transmit the communication to the second computer network.

39. The computer program product according to claim 37 wherein said computer-readable program code means for transmitting a redirect communication comprises computer-readable program code means for transmitting an Internet Control Message Protocol (ICMP) redirect message to the source device.

40. A computer program product for dynamically balancing a load between a plurality of gateways which provide access between a first computer network and a second computer network, the computer program product comprising:
   a computer-readable storage medium having computer-readable program code means embodied in said medium, said computer-readable program code means comprising:
      computer-readable pro-gram code means for receiving at a first of the plurality of gateways a communication from a source device on the first computer network, wherein the communication is to be transmitted to the second computer network;
      computer-readable program code means for determining through which of the plurality of gateways the communication is to be transmitted to the second computer network:
      computer-readable program code means for transmitting the communication to the second computer network if said computer-readable program code means for determining determines that the first gateway is to transmit the communication to the second computer network; and
      computer-readable program code means for transmitting the communication over the first computer network to the one of the plurality of gateways which said computer-readable program code means for determining determines the communication is to be transmitted; and
      wherein said computer-readable program code means for determining comprises:
         computer-readable program code means for splitting a resource identifier of the communication having a plurality of bits into sub-groups of bits based upon the number gateways interconnecting the first computer network and the second computer network;

computer-readable program code means for summing the sub-groups of bits to provide an allocation sum;

computer-readable program code means for dividing the allocation sum by the number of gateways interconnecting the first computer network and the second computer network; and computer-readable program code means for allocating messages to the plurality of gateways based upon the remainder of said computer-readable program code means for dividing.

41. The computer program product of claim 40, wherein the resource identifier is a source address of communications received from the first computer network and a destination address for communications received from the second computer network.

42. The computer program product according to claim 40, further comprising computer-readable program code means for assigning a unique allocation identifier to each of the plurality of gateways and wherein said computer-readable program code means for allocating messages comprises computer-readable program code means for allocating messages to the plurality of gateways based upon the allocation identifier of a gateway and the remainder of said computer-readable program code means for dividing.

43. The computer program product according to claim 42, wherein said computer-readable program code means for assigning comprises computer-readable program code means for assigning as the allocation identifier a numeric identifier of between 0 and n−1 where n is the number of gateways interconnecting the first computer network and the second computer network; and wherein said computer-readable program code means for allocating comprises computer-readable program code means for allocating messages to the gateway having an allocation identifier equal to the remainder of said computer-readable program code means for dividing.

44. The computer program product according to claim 40, wherein said computer-readable program code means for splitting comprises computer-readable program code means for splitting the resource identifier into sub-groups wherein each sub-group includes k bits where k is the lowest power to which 2 may be raised to result in a value equal to or greater than the number of gateways interconnecting the first computer network and the second computer network.

45. The computer program product according to claim 40, wherein said computer-readable program code means for splitting comprises computer-readable program code means for splitting the resource identifier into sub-groups wherein at least one sub-group includes k bits where k is the lowest power to which 2 may be raised to result in a value equal to or greater than the number of gateways interconnecting the first computer network and the second computer network.

46. The computer program product according to claim 40, further comprising computer-readable program code means for masking the address prior to said splitting step.

47. A computer program product for allocating network resources among a plurality of gateways interconnecting a first computer network and a second computer network, the computer program product comprising:

a computer-readable storage medium having computer-readable program code means embodied in said medium, said computer-readable program code means comprising:

computer-readable program code means for splitting a resource identifier having a plurality of bits into sub-groups of bits based upon the number gateways interconnecting the first computer network and the second computer network;

computer-readable program code means for summing the sub-groups of bits to provide an allocation sum;

computer-readable program code means for dividing the allocation sum by the number of gateways interconnecting the first computer network and the second computer network; and computer-readable program code means for allocating resources to the plurality of gateways based upon a remainder of said computer-readable program code means for dividing.

48. The computer program product according to claim 47, further comprising computer-readable program code means for assigning a unique allocation identifier to each of the plurality of gateways and wherein said computer-readable program code means for allocating resources comprises computer-readable program code means for allocating resources to the plurality of gateways based upon the allocation identifier of a gateway and the remainder of said computer-readable program code means for dividing.

49. The computer program product according to claim 48, wherein said computer-readable program code means for assigning comprises computer-readable program code means for assigning as the allocation identifier a numeric identifier of between 0 and n−1 where n is the number of gateways interconnecting the first computer network and the second computer network; and wherein said computer-readable program code means for allocating comprises computer-readable program code means for allocating resources to the gateway having an allocation identifier equal to the remainder of said computer-readable program code means for dividing.

50. The computer program product according to claim 47, wherein said computer-readable program code means for splitting comprises computer-readable program code means for splitting the address into sub-groups wherein each sub-group includes k bits where k is the lowest power to which 2 may be raised to result in a value equal to or greater than the number of gateways interconnecting the first computer network and the second computer network.

51. The computer program product according to claim 47, wherein said computer-readable program code means for splitting comprises computer-readable program code means for splitting the address into sub-groups wherein at least one sub-group includes k bits where k is the lowest power to which 2 may be raised to result in a value equal to or greater than the number of gateways interconnecting the first computer network and the second computer network.

52. The computer program product according to claim 47, further comprising computer-readable program code means for masking the resource identifier prior to said splitting step.

* * * * *

UNITED STATES PATENT AND TRADEMARK OFFICE
CERTIFICATE OF CORRECTION

PATENT NO. : 5,983,281
DATED : November 9, 1999
INVENTOR(S) : David Mark Ogle, Carolyn Haibt Norton, Karen Marie Tracey, Barton Clark Vashaw It is certified that error appears in the above-identified patent and that said Letters Patent is hereby corrected as shown below:

Claims:
Claim 9,
Line 3 should read as follows:
-- numeric identifier of between 0 and n-1 where n is the --

Claim 40,
Line 10 should read as follows:
-- computer-readable program code means for receiving --

Signed and Sealed this

Third Day of July, 2001

*Attest:*

Nicholas P. Godici

*Attesting Officer*

NICHOLAS P. GODICI
*Acting Director of the United States Patent and Trademark Office*